(12) United States Patent
Koo et al.

(10) Patent No.: US 12,266,933 B2
(45) Date of Patent: Apr. 1, 2025

(54) POWER TRADING SYSTEM OF VIRTUAL POWER PLANT AND POWER TRADING METHOD OF VIRTUAL POWER PLANT USING THE SAME

(71) Applicant: KOREA DISTRICT HEATING CORP., Seongnam-si (KR)

(72) Inventors: Ja Kyun Koo, Daejeon (KR); Tae Seon Eom, Seoul (KR); Yong Ha Lee, Hwaseong-si (KR); Min Sung Ko, Hwaseong-si (KR); Dong Hwan Chang, Gimpo-si (KR)

(73) Assignee: KOREA DISTRICT HEATING CORP., Seongnam-si (KR)

( * ) Notice: Subject to any disclaimer, the term of this patent is extended or adjusted under 35 U.S.C. 154(b) by 366 days.

(21) Appl. No.: 17/634,543

(22) PCT Filed: May 10, 2021

(86) PCT No.: PCT/KR2021/005818
§ 371 (c)(1),
(2) Date: Feb. 10, 2022

(87) PCT Pub. No.: WO2021/230596
PCT Pub. Date: Nov. 18, 2021

(65) Prior Publication Data
US 2022/0285942 A1  Sep. 8, 2022

(30) Foreign Application Priority Data
May 15, 2020  (KR) .................... 10-2020-0058708

(51) Int. Cl.
*H02J 3/00* (2006.01)
*G06Q 50/06* (2012.01)

(52) U.S. Cl.
CPC .............. *H02J 3/008* (2013.01); *G06Q 50/06* (2013.01)

(58) Field of Classification Search
CPC ..... G06Q 10/04; G06Q 50/06; H02J 2300/20; H02J 3/008; H02J 3/28; H02J 3/381
See application file for complete search history.

(56) References Cited

U.S. PATENT DOCUMENTS 8,095,245 B1 *  1/2012 Mannepalli ............. F24S 50/00
                                              700/297
9,124,098 B2 *  9/2015 Broniak ............ H02J 13/00017
(Continued)

FOREIGN PATENT DOCUMENTS

JP  2013-545148 A  12/2013
KR  10-1636411 B1  7/2016
(Continued)

OTHER PUBLICATIONS

International Search Report for PCT/KR2021/005818 mailed Sep. 6, 2021 from Korean Intellectual Property Office.
(Continued)

*Primary Examiner* — Vincent H Tran
(74) *Attorney, Agent, or Firm* — Revolution IP, PLLC

(57) ABSTRACT

A power trading system of virtual power plant includes a plurality of virtual power plants connected to a power system and including a distributed energy resource; a heat conversion device connected to the power system and converting the power generated from the plurality of distributed energy resources into thermal energy; and a power trading device configured to analyze an excess and insufficient power amount of the plurality of virtual power plant due to an output variation of the distributed energy resource, control power trading between the plurality of virtual power plant, the power system, or the heat conversion device by using the analysis result of the excess and insufficient power
(Continued)

amount to stabilize the output of the power system and the virtual power plant.

14 Claims, 10 Drawing Sheets

(56) References Cited

U.S. PATENT DOCUMENTS

| | | | |
|---|---|---|---|
| 2016/0062380 A1* | 3/2016 | Schwarz | G05F 1/66 700/295 |
| 2017/0102675 A1* | 4/2017 | Drees | H02S 50/00 |
| 2018/0039244 A1* | 2/2018 | Son | G06Q 10/04 |
| 2019/0072339 A1* | 3/2019 | Wirz | F24H 7/0208 |
| 2020/0076196 A1* | 3/2020 | Lee | H02J 3/008 |
| 2021/0151989 A1* | 5/2021 | Tsujii | H02J 3/003 |
| 2022/0285939 A1* | 9/2022 | Koo | G05B 19/042 |
| 2022/0285940 A1* | 9/2022 | Koo | H02J 3/381 |

FOREIGN PATENT DOCUMENTS

| | | |
|---|---|---|
| KR | 10-2017-0132662 A | 12/2017 |
| KR | 10-2019-0076572 A | 7/2019 |
| KR | 10-2019-0111202 A | 10/2019 |
| KR | 10-2019-0140296 A | 12/2019 |

OTHER PUBLICATIONS

Office Action of KR Patent Application No. 10-2020-0058708 mailed Sep. 13, 2021.

* cited by examiner

POWER TRADING SYSTEM OF VIRTUAL POWER PLANT AND POWER TRADING METHOD OF VIRTUAL POWER PLANT USING THE SAME

CROSS REFERENCE TO PRIOR APPLICATIONS

This application is the 35 U.S.C. 371 national stage of International application PCT/KR2021/005818 filed on May 10, 2021 which claims priority to Korean Patent Application No. 10-2020-0058708 filed on May 15, 2020. The entire contents of each of the above-identified applications are hereby incorporated by reference.

BACKGROUND OF THE INVENTION

(a) Field of the Invention

The present invention relates to a power trading system of virtual power plant and a power trading method of virtual power plant using the same.

(b) Description of the Related Art

Recently, the proportion of new renewable energy sources has been steadily increasing due to the depletion of fossil fuels and energy shortages. In addition, the proportion of new renewable energy sources is expanding worldwide in order to respond to the global climate crisis and secure industrial competitiveness. And, in order to supplement the existing centralized power supply method, a Distributed Energy Resource(DER) is being actively introduced into the power system.

The distributed energy resource can be installed on a small or medium scale near the load, can be installed in a short period of time, and has the advantage of being able to start within a short time. In addition, a virtual power plant (VPP) is an integrated management system for operating various types of distributed energy resources scattered within the power grid as a single power generation system using advanced information and communication technology and automatic control technology.

However, the distributed energy generation using a renewable energy source is difficult to control the output because the output changes rapidly depending on the climate and weather, and may cause an imbalance in power supply and demand due to the instantaneous output variability.

For example, when the power generation amount of the distributed energy generation exceeds the bidding generation amount due to a sudden increase in the output of the distributed energy resource, the frequency of the power system or the virtual power plant may be increased. In addition, an imbalance in power supply and demand may occur due to an excess of power supply. In addition, when the power generation amount of the distributed energy resource is lower than the bid generation amount due to a sharp decrease in the output of the distributed energy resource, the frequency of the power system is lowered, and there is a problem that an imbalance in power supply and demand occurs due to a lack of power supply.

Therefore, a method for stably operating the power system and the virtual power plant is required.

On the other hand, recently, a method of storing new renewable energy through an Energy storage system (ESS) or a pumped-water power plant and supplementing the insufficient amount of electricity is being studied.

However, ESS is expensive and economical is low. In addition, the ESS cannot store large-capacity power due to its capacity limitation, and this has made it difficult to supplement the insufficient amount of power in the power system. In addition, ESS also has a problem of low stability due to fire or explosion.

In addition, although the pumped-water power plant can store large-capacity power, it has low economic feasibility due to high installation and operating costs, and has difficulty in operating time as short as less than 2 hours. Further, the pumped-water power plant has a problem in that there are many restrictions on the installation site, the construction period is long, and it has a problem of destroying the surrounding environment.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a power trading system and a power trading method of virtual power plant capable of stabilizing the output of a power system and a virtual power plant by analyzing an excess and insufficient power amount of a virtual power plant due to an output variation of a distributed energy resource, and controlling power trading between a virtual power plant and a heat conversion device or controlling power trading between a virtual power plant and a renewable combined heat and power plant according to the excess and insufficient power amount of the virtual power plant.

An exemplary embodiment of the present invention provides a power trading system of virtual power plant, comprising: a plurality of virtual power plants connected to a power system and including a distributed energy resource; a heat conversion device connected to the power system and converting the power generated from the plurality of distributed energy resources into thermal energy; and a power trading device configured to analyze an excess and insufficient power amount of the plurality of virtual power plant due to an output variation of the distributed energy resource, control power trading between the plurality of virtual power plant, the power system, or the heat conversion device by using the analysis result of the excess and insufficient power amount to stabilize the output of the power system and the virtual power plant.

The power trading system may further include power system and produces electricity using a new and renewable energy source, the power trading device may control the power trading to supply power produced in the renewable combined heat and power plant to the plurality of virtual power plant or the power system based on a prediction result of the excess and insufficient power amount.

The power trading device may analyze at least one of a power generation amount, a bidding error, an output variation or a demand variation of the plurality of virtual power plant, and control the power trading by using at least one of the power generation amount, the bidding error, the output variation or the demand variation.

The power trading device may control the power trading to supply a surplus power of a virtual power plant to the heat conversion device to stabilize an output of the virtual power plant if the surplus power is generated in at least one virtual power plant of the plurality of virtual power plant due to the bidding error, the output variation, or the demand variation.

The power trading device may control the power trading to supply a power generated in the renewable combined heat and power plant to the virtual power plant or the power system to stabilize an output of the virtual power plant if an output shortage is predicted in at least one virtual power plant of the plurality of virtual power plant due to the bidding error, the output variation, or the demand variation.

The power trading device may predict the excess and insufficient power amount of the virtual power plant by comparing a VPP bidding power generation amount of the virtual power plant and a VPP expected output amount of the virtual power plant.

The power trading device may derive a VPP power generation amount generated in the virtual power plant by monitoring an amount of power generated by the distributed energy resource connected to the virtual power plant in real time, and derive a VPP expected output amount by subtracting a power consumption consumed by a load of the virtual power plant from the VPP power generation amount.

The power trading device may determine that a surplus power is produced in the virtual power plant if the VPP expected output amount is greater than the VPP bidding power generation amount, and control the power trading so that the virtual power plant supplies a surplus power of the difference between the VPP expected output amount and the VPP bidding power generation amount to the heat conversion device.

The power trading device may determine that an output of the virtual power plant is insufficient if the VPP expected output amount is less than the VPP bidding power generation amount, and control the power trading so that the renewable combined heat and power plant generates power of a difference between the VPP bidding power generation amount and the VPP expected output amount and supplies it to the virtual power plant or the power system.

The distributed energy resource may include at least one of a wind power generator, a solar power generator, a geothermal power generator, a fuelbattery, a bio energy, a marine energy, or a variable power source whose output cannot be adjusted.

The renewable combined heat and power plant may generate power using at least one of a wood chip, a fuel cell, or by-product gas.

The power trading device may control the power trading by predicting a demand response of a load connected to the power system or the plurality of virtual power plants.

The power trading device may analyze a response amount at which the distributed energy resources can additionally generate power in order to respond to an output variation of a variable power source connected to the virtual power plant or a response rate at which the distributed energy resources can additionally generate power in order to respond to an output variation of the variable power source, and adjust the power trading if power supplying in the virtual power plant is smaller than the power demand of load disposed in the virtual power plant due to the decrease in the output of the variable power source, or if the response amount or the response rate of the distributed energy resources does not meet power demand amount of the load disposed in the virtual power plant.

An exemplary embodiment of the present invention provide a power trading method of virtual power plant, the method comprising: analyzing an output variability of a distributed energy resource disposed to a virtual power plant connected to a power system; predicting an excess and insufficient power amount of the virtual power plant according to the output variability of the distributed energy resource; and controlling power trading between a virtual power plant, a power system, a heat conversion device connected to the power system, or a renewable combined heat and power plant connected to the power system based on the prediction result of the excess and insufficient power amount, and controlling the power trading to consume the surplus power of the virtual power plant in the heat conversion device or to supplement an insufficient output of the virtual power plant with the power of the renewable combined heat and power plant.

The controlling the power trading may control the power trading based on at least one of a VPP bidding power generation amount of the virtual power plant, a power generation amount of the distributed energy resource, system information of a power system, or control signal received from outside of the virtual power plant.

The controlling the power trading may include detecting a zone frequency of the virtual power plant in real time, and@@@controlling a power trading amount between the virtual power plant, the heat conversion device, or the renewable combined heat and power plant in real time based on the zone frequency.

The method may further include deriving a VPP power generation amount generated by the virtual power plant by monitoring a power generation amount generated from a plurality of distributed energy resources, and calculating a VPP expected output amount by subtracting a power consumption amount of the load of the virtual power plant from the VPP power generation amount The method may further include comparing the VPP expected output amount and a VPP bidding power generation amount, and adjusting power trading between the virtual power plant, the power system, the heat conversion device, and the renewable combined heat and power plant based on the comparison result.

The adjusting the power trading may include determining that surplus power is produced in the virtual power plant if the VPP expected output amount is greater than the VPP bidding power generation amount, and controlling power trading between the virtual power plant and the heat conversion device to supply the surplus power of a difference between the VPP expected output amount and the VPP bidding power generation amount to the heat conversion device.

The adjusting the power trading may include determining that an output of the virtual power plant is insufficient if the VPP expected output amount is less than the VPP bidding power generation amount, and controlling the power trading between the renewable combined heat and power plant and the virtual power plant so that the renewable combined heat and power plant generates power of a difference between the VPP bidding power generation amount and the VPP expected output amount and supplies it to the virtual power plant or the power system.

The distributed energy resource may include at least one of a wind power generator, a solar power generator, a geothermal power generator, a fuelbattery, a bio energy, a marine energy, or a variable power source whose output cannot be adjusted.

The renewable combined heat and power plant may generate power using at least one of a wood chip, a fuel cell, or by-product gas.

The method may further include predicting a demand response of the virtual power plant, and controlling power trading between the virtual power plant, the power system, the heat conversion device, and the renewable combined heat and power plant based on the demand response.

The method may further include analyzing a response amount at which the distributed energy resources can additionally generate power in order to respond to an output variation of a variable power source connected to the virtual power plant or a response rate at which the distributed energy resources can additionally generate power in order to respond to an output variation of the variable power source, and adjusting the power trading if the response amount or the response rate of the distributed energy resources does not meet power demand amount of the load disposed in the virtual power plant.

An exemplary embodiment of the present invention provide a virtual power plant power trading device, comprising: a data collection module collecting various data of a virtual power plant connected to a power system; a analysis module configured to analyze at least one of a power generation amount, a bidding error, an output variation or a demand variation of the virtual power plant, and analyze an output variation of the virtual power plant and an excess and insufficient power amount of the virtual power plant due to change of power generation amount of a distributed energy resource connected to the virtual power plant; and a power trading module controlling power trading between a plurality of virtual power plant, heat conversion device, and renewable combined heat and power plant by using at least one of the bidding error, the output variation, and the excess and insufficient power amount of the virtual power plant.

According to the exemplary embodiment of the present invention, the power trading system and power trading method of the virtual power plant analyzes the excess and insufficient power amount of the virtual power plant due to the output variation of the distributed energy resource, and controls the power trading between the virtual power plant and the heat conversion device according to the excess and insufficient power amount or controls the power trading between the virtual power plant and the renewable combined heat and power plant according to the excess and insufficient power amount, thereby stabilizing the output of the power system and the virtual power plant.

Further, according to the present invention, the surplus power produced by the output fluctuation of distributed energy resource is supplied to the heat conversion device, and the power trading is controlled so that the heat conversion device consumes the surplus power to produce thermal energy. Through this, it is possible to minimize the output fluctuation of the virtual power plant due to the output fluctuation of the distributed energy resource, which is difficult to control the output such as a renewable energy source, and to maintain the output of the virtual power plant stably.

Further, the present invention provides an environment in which the waste of energy sources can be prevented by storing the heat energy produced in the heat conversion device in a large capacity and providing it to the heat load.

Further, the present invention may adjust the amount of power generation of the renewable combined heat and power plant in response to output fluctuations of the virtual power plant and the distributed energy resources, and supplement the insufficient output of the virtual power plant with the power generated in the renewable combined heat and power plant. Through this, it provides an environment in which the output of the virtual power plant can be stably maintained by minimizing the output shortage of the virtual power plant caused by distributed energy resources that are difficult to control output such as new and renewable energy sources and the output fluctuation of the virtual power plant.

Further, the present invention may analyze the predicted power generation amount of each individual distributed energy resource, derive the VPP predicted power generation amount by summing the predicted power generation amount of the distributed energy resources, and derive the VPP bidding power generation amount based on the VPP predicted power generation amount. Through this, the present invention provides an environment in which the optimal bidding power generation amount can be effectively determined.

Further, the present invention may derive the VPP power generation amount or the VPP expected output amount generated in real time within the virtual power plant by monitoring the amount of power generated from a plurality of distributed energy resources, and control the power trading between the power transaction between the virtual power plant and the heat conversion device and the renewable combined heat and power plant by comparing the VPP power generation amount or VPP expected output amount with the VPP bidding power generation amount. Through this, the present invention provides an environment capable of stably maintaining the output of the virtual power plant.

Further, the present invention may detect the system frequency of the power system or the zone frequency of the virtual power plant in real time, and control the power trading based on the detected frequency. Through this, the present invention provides an environment capable of preventing a sudden change in the system frequency of the power system and a sudden change in the zone frequency of the virtual power plant due to output fluctuations of distributed energy resources, which are variable power sources.

Further, the present invention controls the power trading based on at least one of the VPP bidding power generation amount, the power generation amount of individual distributed energy resources, system information of the power system, or a control signal received from the power exchange. Through this, the present invention provides an environment capable of stably maintaining the output of the virtual power plant and stably maintaining the power system.

DETAILED DESCRIPTION OF THE EMBODIMENTS

Figure 1:
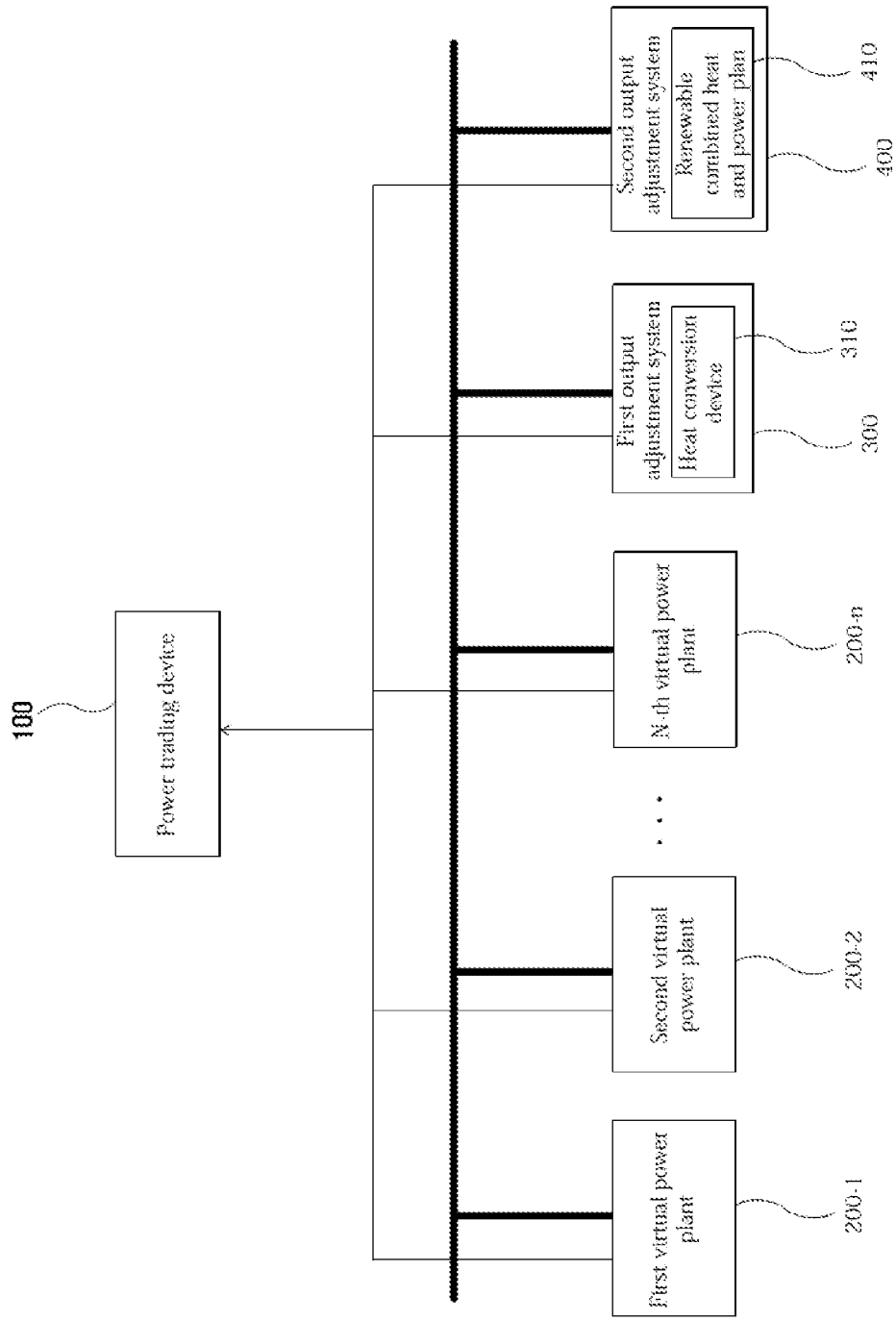
FIG. 1 is a diagram schematically illustrating a structure of a power trading system of virtual power plant.

An exemplary embodiment of the present invention will hereinafter be described in detail with reference to the accompanying drawings.

The scheme described in the specification is an exemplary embodiment of the present invention and it is to be understood that the invention is not limited to the disclosed embodiment, but, on the contrary, is intended to cover various modifications and equivalent arrangements included within the spirit and scope of the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Further, in the drawings, a size and thickness of each element are randomly represented for better understanding and ease of description, and the present invention is not limited thereto and the thickness of layers, films, panels, regions, etc., are exaggerated for clarity.

In the entire specification, in addition, unless explicitly described to the contrary, the word "comprise" and variations such as "comprises" or "comprising" will be understood to imply the inclusion of stated elements but not the exclusion of any other elements. In addition, the terms "-er", "-or", "-or", and "module" described in the specification mean units for processing at least one function and operation, and can be implemented by hardware components or software components, and combinations thereof.

In addition, unless defined otherwise in the detailed description, all the terms including technical and scientific terms have the same meaning as meanings generally understood by those skilled in the art to which the present invention pertains. Generally used terms such as terms defined in a dictionary should be interpreted as the same meanings as meanings within a context of the related art and should not be interpreted as ideally or excessively formal meanings unless clearly defined in the present specification.

Further, in the description of the present exemplary embodiment, if it is determined that the detailed description on the technology well-known in the art and the constitution may unnecessarily cloud the concept of the present invention, the detailed description thereof will be omitted herein.

Hereinafter, a power trading system of virtual power plant and a power trading method of virtual power plant according to an exemplary embodiment of the present invention will be described in detail with reference to FIGS. 1 to 10.

Figure 2:
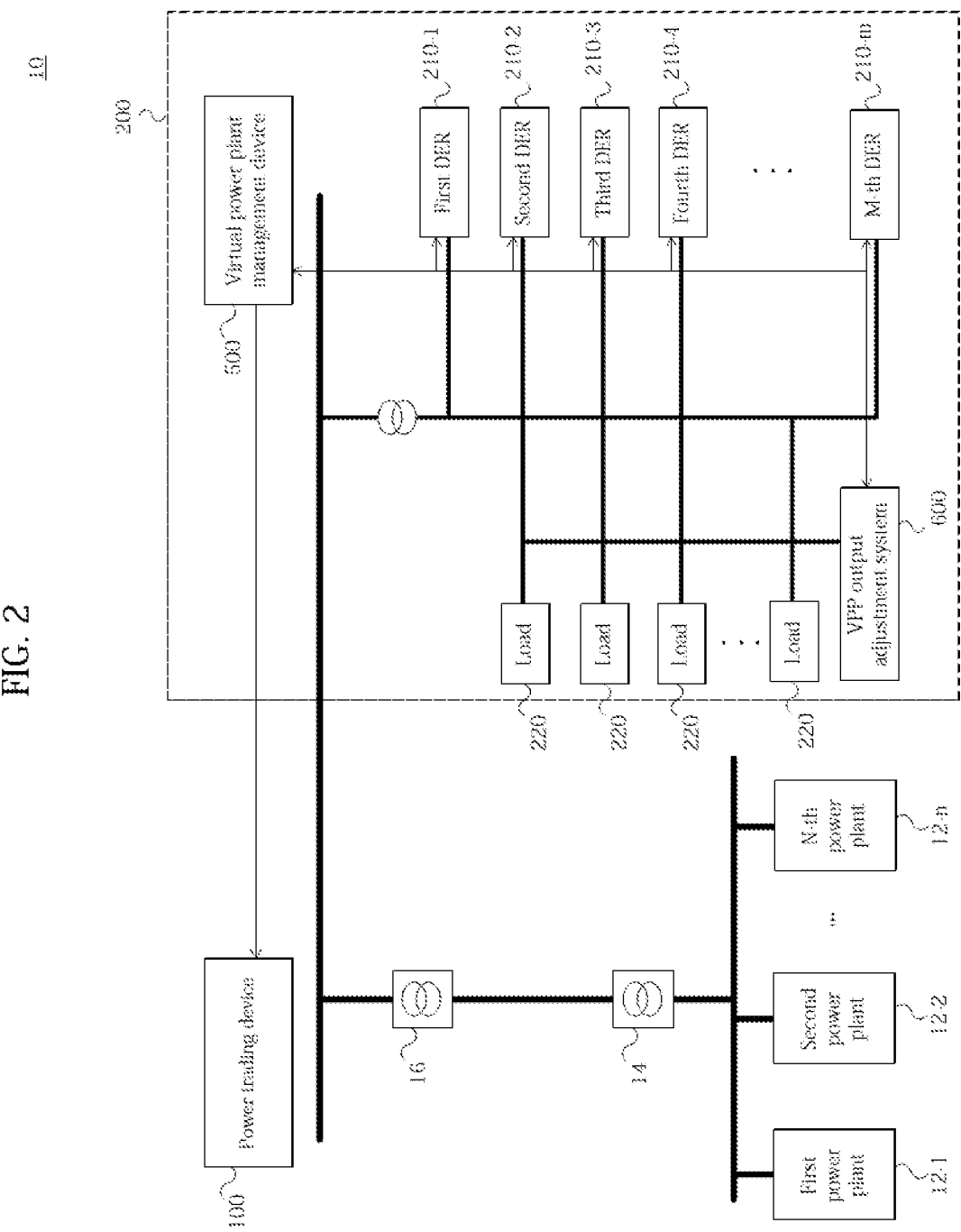
FIG. 2 is a diagram schematically illustrating a structure of a virtual power plant connected to a power system according to an exemplary embodiment of the present invention.

FIG. 1 is a diagram schematically illustrating a structure of a power trading system of virtual power plant, and FIG. 2 is a diagram schematically illustrating a structure of a virtual power plant connected to a power system according to an exemplary embodiment of the present invention. In this case, a power trading system of virtual power plant, a power system 10, and a virtual power plant 200, only schematic configurations required for description according to the exemplary embodiment of the present invention are illustrated and the present invention is not limited to the configurations.

Referring to FIG. 1, a virtual power plant(hereinafter, VPP) power trading system according to an exemplary embodiment of the present invention may analyze an excess and insufficient power amount of a plurality of virtual power plant 200-1 to 200-*n* due to an output variation of distributed energy resources.

And, the power trading system of virtual power plant according to an exemplary embodiment of the present invention may stabilize an output of a power system 10 and the virtual power plant 200-1 to 200-*n* by controlling power trading using an analysis result of the excess and insufficient power amount.

In addition, the power trading system of virtual power plant according to an exemplary embodiment of the present invention may include a power trading device 100 controlling power trading of a power system 10, a plurality of virtual power plants 200-1 to 200-*n* connected to the power system 10, a first output adjustment system 300 adjusting an output of the virtual power plant 200 by consuming a surplus power of the virtual power plant 200, and a second output adjustment system 400 adjusting an output of the virtual power plant 200 supplying a power to the virtual power plant 200.

In addition, the power trading system of virtual power plant according to an exemplary embodiment of the present invention may operate electricity market to supply the power produced by the plurality of power plants 12-1 to 12-*n* of the power system 10 through the transmission substation 14 and the distribution substation 16 to power users.

The power trading device 100 may conduct a bidding with the plurality of virtual power plant 200-1 to 200-*n*, and control power trading to supply some of the power produced by the plurality of virtual power plant 200-1 to 200-*n* to the power system 10.

Further, the power trading device 100 may analyze an excess and insufficient power amount of the plurality of virtual power plant 200-1 to 200-*n* due to an output variation of the distributed energy resource 210.

And, the power trading device 100 may control power trading between the power system 10, the plurality of virtual power plant 200-1 to 200-*n*, the first output adjustment system 300, and the second output adjustment system 400 by using an analysis result of the excess and insufficient power amount. Through this, the present invention may stabilize the output of the power system 10 and the virtual power plant 200.

For example, the power trading device 100 may control the power trading to supply the surplus power of the plurality of virtual power plant 200-1 to 200-*n* to the first output adjustment system 300 based on a prediction result of the excess and insufficient power amount.

Further, the power trading device 100 may control the power trading to supply the power generated from the second output adjustment system 400 to the plurality of virtual power plant 200-1 to 200-*n* based on a prediction result of the excess and insufficient power amount.

Herein, the first output adjustment system 300 may include a heat conversion device 310 receiving a portion of the power produced from the plurality of distributed energy resources 210-1 to 210-$m$ and converting it into thermal energy.

And, the second output adjustment system 400 may include a renewable combined heat and power plant 410 generating electric power by using a new and renewable energy source. For example, the renewable combined heat and power plant 410 may generate power using at least one of a wood chip, a fuel cell, or by-product gas.

The heat conversion device 310 of the first output adjustment system 300 and the renewable combined heat and power plant 410 of the second output adjustment system 400 have advantages of low cost and high responsiveness, unlike conventional ESS (Energy storage system) or pumped-water power plants.

Further, the heat conversion device 310 and the renewable combined heat and power plant 410 is easy to install around the distributed energy resource 210 or the virtual power plant 200, and has the advantage of low restrictions on the installation area.

In addition, the power trading device 100 may analyze information on the amount of response that the distributed energy resources may additionally generate in order to respond to an output change of a variable power source connected to the virtual power plant 200.

Herein, the information on the amount of response may include a response amount at which the distributed energy resources connected to the virtual power plant 200 can additionally generate power in order to respond to an output variation of a variable power source (eg, a new renewable energy source) connected to the virtual power plant 200. And the information on the amount of response may include a response rate at which the distributed energy resources can additionally generate power in order to respond to an output variation of the variable power source.

In addition, the response amount includes the amount of power that the distributed energy resources connected to the virtual power plant 200 can additionally generate in order to respond to output fluctuations of the variable power source (eg, a new and renewable energy source) connected to the virtual power plant 200. And, the response rate includes a power generation rate at which distributed energy resources connected to the virtual power plant 200 can additionally generate power in response to an output change of the variable power source connected to the virtual power plant 200. In this case, the response amount and the response speed may include ramp rate characteristic information of the distributed energy resources.

And, when the output of the variable power is reduced and the power supply in the virtual power plant 200 is smaller than the power demand of a load disposed in the virtual power plant 200, the power trading device 100 may control the power trading between the virtual power plant 200 and the first output adjustment system 300 and the second output adjustment system 400. Also when the response amount or response speed of the distributed energy plants does not satisfy the power demand amount of the load disposed in the virtual power plant, the power trading device 100 may control the power trading between the virtual power plant 200 and the first output adjustment system 300 and the second output adjustment system 400.

For example, when the power supply in the virtual power plant 200 is smaller than the power demand of a load disposed in the virtual power plant 200 due to a decrease in the output of the variable power source, the present invention reduces power trading amount from the virtual power plant 200 to the first output adjustment system 300 or increases power trading amount from the second output adjustment system 400 to the virtual power plant 200. Alternatively, when the response amount or response speed of the distributed energy resources does not meet the power demand amount of the load disposed in the virtual power plant, the present invention reduces power trading amount from the virtual power plant 200 to the first output adjustment system 300 or increases power trading amount from the second output adjustment system 400 to the virtual power plant 200.

Further, to respond to the output change of the variable power source connected to the power system 10 or the virtual power plant 200, the power trading device 100 may analyze the response amount information that the renewable combined heat and power plant 410 may additionally generate power.

And, when the output of the variable power connected to the virtual power plant 200 is reduced and the power supply in the virtual power plant 200 is smaller than the power demand of a load disposed in the virtual power plant 200, the power trading device 100 may adjust the power trading between the virtual power plant 200 and the first output adjustment system 300 and the second output adjustment system 400 based on the response amount information of the renewable combined heat and power plant 410.

Referring to FIG. 2, the plurality of virtual power plant 200-1 to 200-$n$ may include various types of Distributed Energy Resource (DER) 210. And, the plurality of virtual power plant 200-1 to 200-$n$ may supply the power produced from the distributed energy resource 210 to the power system.

Herein, the distributed energy resource 210 may include at least one of a wind power generator, a solar power generator, a geothermal power generator, a fuelbattery, a bio energy, a marine energy, or a variable power source whose output cannot be adjusted.

In addition, the plurality of virtual power plant 200-1 to 200-$n$ may conduct a bidding with the power trading device 100 through the virtual power plant management device 500. The virtual power plant management device 500 may determine a VPP bidding power generation amount supplied from the virtual power plant 200 to the power system 10. Herein, the VPP bidding power generation amount includes a power supply amount or power output amount supplied from the virtual power plant 200 to the power system 10 during the bidding period.

In addition, the plurality of virtual power plant 200-1 to 200-$n$ may supply some of the power produced by the plurality of the distributed energy resources 210-1 to 210-$m$ connected to the virtual power plant 200 to the power system 10 according to the VPP bidding power generation amount.

For example, the virtual power plant management device 500 may execute a bid by predicting the amount of power generated by the plurality of distributed energy resources 210-1 to 210-$m$. In addition, the virtual power plant management device 500 may determine a VPP bidding power generation amount by subtracting the power consumption consumed by the load 220 in the virtual power plant 200 from the predicted power generation amount of the plurality of distributed energy resources 210-1 to 210-$m$.

Further, the virtual power plant management device 500 may analyze the output variation and error of the virtual power plant 200 due to the output variation of the plurality of distributed energy resources 210-1 to 210-$m$. In addition, the virtual power plant management device 500 may predict the power demand amount of the load 220 disposed in the virtual power plant 200, and analyze the output variation and error of the virtual power plant 200 based on the power demand amount.

And, the virtual power plant management device 500 may stabilize the output fluctuation of the virtual power plant 200 by controlling the operation of the virtual power plant output adjustment system 600 disposed in the virtual power plant 200 based on the analysis result of the output variation and error of the virtual power plant 200.

Herein, the virtual power plant output adjustment system 600 may include a heat conversion device receiving a portion of the power produced from the plurality of distributed energy resources 210-1 to 210-m and converting it into thermal energy, and a renewable combined heat and power plant that generates electricity using a renewable energy source.

Figure 3:
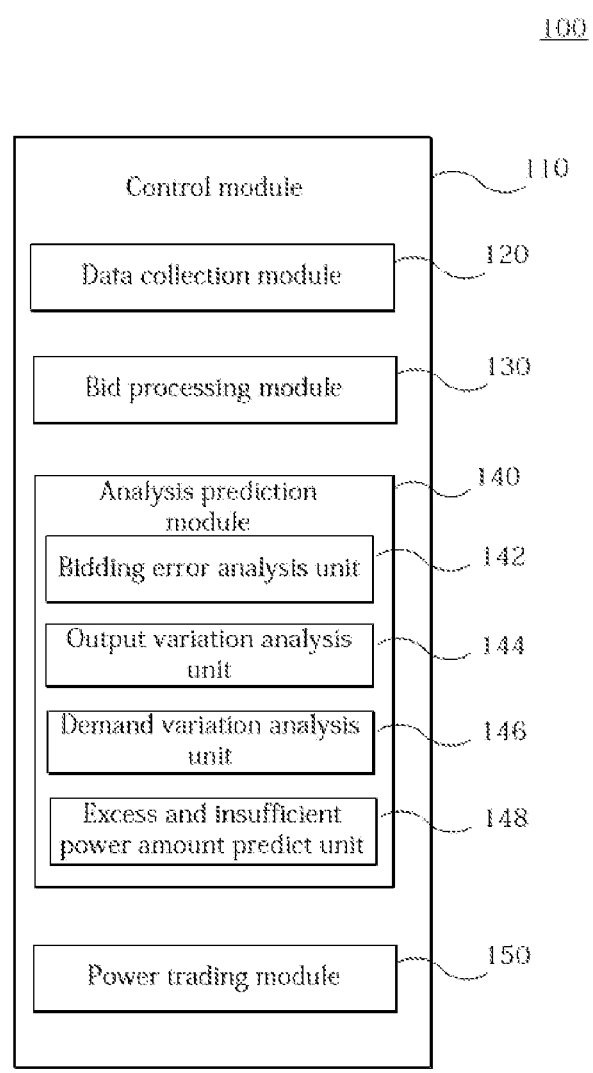
FIG. 3 is a block diagram showing a schematic configuration of a power trading device according to an exemplary embodiment of the present invention.

FIG. 3 is a block diagram showing a schematic configuration of a power trading device according to an exemplary embodiment of the present invention. In this case, the power trading device 100, only schematic configurations required for description according to the exemplary embodiment of the present invention are illustrated and the present invention is not limited to the configurations.

Referring to FIG. 3, the power trading device 100 according to an exemplary embodiment of the present invention may control power trading by analyzing the excess and insufficient power amount of the plurality of virtual power plant 200-1 to 200-n connected to the power system 10.

Herein, the excess and insufficient power amount may include a surplus power generated in excess of the virtual power plant 200 generated by a sudden increase in the output of the distributed energy resource 210 connected to the virtual power plant 200. In addition, the excess and insufficient power amount may include an insufficient amount of power of the virtual power plant 200 generated by a sudden decrease in the output of the distributed energy resource 210 or a rapid increase in the power consumption of the load 220.

And, the power trading device 100 may analyze at least one of a power generation amount, a bidding error, an output variation or a demand variation of the plurality of virtual power plant 200-1 to 200-n, and control the power trading by using at least one of the power generation amount, the bidding error, the output variation or the demand variation.

And, the power trading device 100 may control the power trading between the plurality of virtual power plant 200-1 to 200-n and the heat conversion device 310 by analyzing the bidding error, the output variation, or the demand variation of the plurality of virtual power plant 200-1 to 200-n.

For example, if a surplus power is generated in the virtual power plant 200 due to the bidding error, the output variation, or the demand variation, the power trading device 100 may control the power trading to supply a surplus power of a virtual power plant 200 to the heat conversion device 310 to stabilize the output of the virtual power plant 200.

Further, the power trading device 100 may control the power trading between the plurality of virtual power plant 200-1 to 200-n and the renewable combined heat and power plant 410 by analyzing the bidding error, the output variation, or the demand variation of the plurality of virtual power plant 200-1 to 200-n.

For example, if an output shortage is predicted in the virtual power plant 200 due to the bidding error, the output variation, or the demand variation, the power trading device 100 may control the power trading to supply a power generated in the renewable combined heat and power plant 410 to the virtual power plant 200 or the power system 10 to stabilize the output of the virtual power plant 200 and the power system 10.

In addition, the power trading device 100 may predict the excess and insufficient power amount of the virtual power plant 200-1 to 200-n by comparing a VPP bidding power generation amount of each of the virtual power plant 200-1 to 200-n and a VPP expected output amount of each of the virtual power plant 200-1 to 200-n.

Herein, the power trading device 100 may monitor the amount of power generated by the distributed energy resource 210 in real time, and derive a VPP power generation amount generated in the virtual power plant 100 in real time. In addition, the power trading device 100 may derive a VPP expected output amount by subtracting the power consumption amount consumed by the load 220 of the virtual power plant 200 from the VPP power generation amount.

For example, the power trading device 100 may determine that the surplus power is produced in the virtual power plant 200 when the VPP expected output amount is greater than the VPP bidding power generation amount.

And, the power trading device 100 may control the power trading so that the virtual power plant 200 supplies the surplus power equal to the difference between the VPP expected output amount and the VPP bidding power generation amount to the heat conversion device 310.

Further, when the VPP expected output amount is less than the VPP bidding power generation amount, the power trading device 100 may determine that the output of the virtual power plant 200 will be insufficient.

In addition, the power trading device 100 may control the power trading so that the renewable combined heat and power plant 410 produces power equal to the difference between the VPP bidding power generation amount and the VPP expected output amount, and supplies to the virtual power plant 200 or the power system 10.

The power trading device 100 according to an exemplary embodiment of the present invention may include a control module 110, a data collection module 120, a bid processing module 130, an analysis prediction module 140, and a power trading module 150.

The control module 110 may analyze an excess and insufficient power amount of the plurality of virtual power plant 200-1 to 200-n due to the output variation of the plurality of distributed energy resources 210-1 to 210-m connected to the plurality of virtual power plant 200-1 to 200-n and the demand variation of the load 220. Also the control module 110 may control the operation of each unit to stabilize the output fluctuation of the virtual power plant by controlling the power trading based on the analysis result.

The data collection module 120 may collect various data of the plurality of virtual power plant 200-1 to 200-n. Also, the data collection module 120 may collect power system information and power system analysis information of the power system 10.

For example, the various data of the plurality of the virtual power plant may include power generation amount information of the plurality of distributed energy resources 210-1 to 210-m, and power consumption amount information of the load 220.

Further, the power system information and power system analysis information may include the ramp rate characteristic information of the generators 12 connected to the power system 10, the system frequency information of the power system 10, power supply and demand information of the power system 10, net load information by the variable power source of the power system 10, response amount information by the variable power source, new and renewable output fluctuation information connected to the power system 10, and reserve power of the power system 10 information, etc.

Herein, the ramp rate characteristic information is a change in generator output per minute, and includes an evaporation rate of a generator, a desensitization rate of a generator, or a speed adjustment rate of a generator.

And, the system frequency information of the power system 10 includes a real-time system frequency, a system frequency predicted value, a frequency change rate, or frequency sensitivity. The frequency change rate or frequency sensitivity includes the rate of change or degree of change of the system frequency with time.

And, the frequency change rate may have a positive value (+) or a negative value (−). For example, a case in which the frequency change rate is a positive number may include a case in which the system frequency rapidly increases. And, the case in which the frequency change rate is a negative number may include a case in which the system frequency is sharply decreased.

Further, the power supply and demand information of the power system 10 includes power supply and demand imbalance of the power system 10. Herein, the power supply and demand imbalance of the power system 10 may include a case where the deviation between the power supply and the power demand of the power system 10 exceeds the power supply and demand preset value due to a sudden change of a dropout of the generator connected to the power system 10, a sudden change in power demand of the power system 10, or the output of the variable power source 16 connected to the power system 10.

In addition, the net load information includes a value obtained by subtracting an output amount of a variable power source (eg, a renewable energy source) connected to the power system 10 from the total load amount of the power system 10.

Further, the response amount information may include a response amount value that the generators connected to the power system can additionally generate in order to respond to output fluctuations of a variable power source (eg, a renewable energy source) connected to the power system 10, or may include a response rate at which the generator can additionally generate power in response to fluctuations in the output of the variable power source.

The bid processing module 130 may predict an output amount of the plurality of virtual power plant 200-1 to 200-n, and conduct a bidding with the plurality of virtual power plant 200-1 to 200-n. Further, the bid processing module 130 may conduct the bidding with the plurality of virtual power plant 200-1 to 200-n based on the power system information and power system analysis information.

The bid processing module 130 may conduct the bidding with the plurality of virtual power plant 200-1 to 200-n by considering the various data of the virtual power plant, the power system information and power system analysis information. And the bid processing module 130 may determine the VPP bidding power generation amount of each of the plurality of virtual power plant 200-1 to 200-n. Herein, the VPP bidding power generation amount includes the power supply amount or power output amount supplied from the virtual power plant 200 to the power system 10 during the bidding period.

The analysis prediction module 140 may analyze a power generation amount, a bidding error, an output variation or a demand variation of the plurality of virtual power plant 200-1 to 200-n. And, the analysis prediction module 140 may analyze and predict the excess and insufficient power amount of the plurality of virtual power plant 200-1 to 200-n due to the output variation of the distributed energy resource 220.

The analysis prediction module 140 according to an exemplary embodiment of the present invention may include a bidding error analysis unit 142, an output variation analysis unit 144, a demand variation analysis unit 146, and an excess and insufficient power amount predict unit 148.

The bidding error analysis unit 142 may analyze a bidding error of the plurality of virtual power plant 200-1 to 200-n according to the output variation of the distributed energy resource 210.

The output variation analysis unit 144 may analyze an output variability of the plurality of virtual power plant 200-1 to 200-n due to the output variation of the distributed energy resource 210.

The demand variation analysis unit 146 may analyze a demand variation due to power consumption amount change of the load 220 disposed in the plurality of virtual power plant 200-1 to 200-n.

And, the excess and insufficient power amount predict unit 148 may analyze and predict an excess and insufficient output amount of each of the plurality of virtual power plant 200-1 to 200-n by considering the bidding error, the output variation of the distributed energy resource 210 or the virtual power plant 200, and the demand variation.

The power trading module 150 may control the power trading between the plurality of virtual power plant 200-1 to 200-n and the heat conversion device 310 and the renewable combined heat and power plant 410 based on the bidding error, the output variation, the demand variation, and the excess and insufficient output amount of the plurality of virtual power plant 200-1 to 200-n.

For example, when the surplus power is generated in the virtual power plant 200 due to the bidding error, the output variation, or the demand variation, the power trading module 150 may control the power trading to supply the surplus power of the virtual power plant 200 to the heat conversion device 310.

Alternatively, when the output shortage is predicted in the virtual power plant 200 due to the bidding error, the output variation, or the demand variation, the power trading module 150 may control the power trading to supply power additionally generated in the renewable combined heat and power plant 410 to the virtual power plant 200 or the power system 10.

Further, the power trading module 150 may control the power trading by comparing the VPP expected output amount with the VPP bidding power generation amount of each of the plurality of virtual power plant 200-1 to 200-n.

For example, the power trading module 150 may determine that the surplus power is produced in the virtual power plant 200 when the VPP expected output amount is greater than the VPP bidding power generation amount. And the power trading module 150 may control the power trading so that the virtual power plant 200 supplies surplus power equal to the difference between the VPP expected output amount and the VPP bidding power generation amount to the heat conversion device 310.

Further, the power trading module 150 may determine that the output of the virtual power plant 200 will be insufficient when the VPP expected output amount is smaller than the VPP bidding power generation amount. And the power trading module 150 may control the power trading so that the renewable combined heat and power plant 410 produces power equal to the difference between the VPP bidding power generation amount and the VPP expected output amount and supplies it to the virtual power plant 200 or the power system 10.

Figure 4:
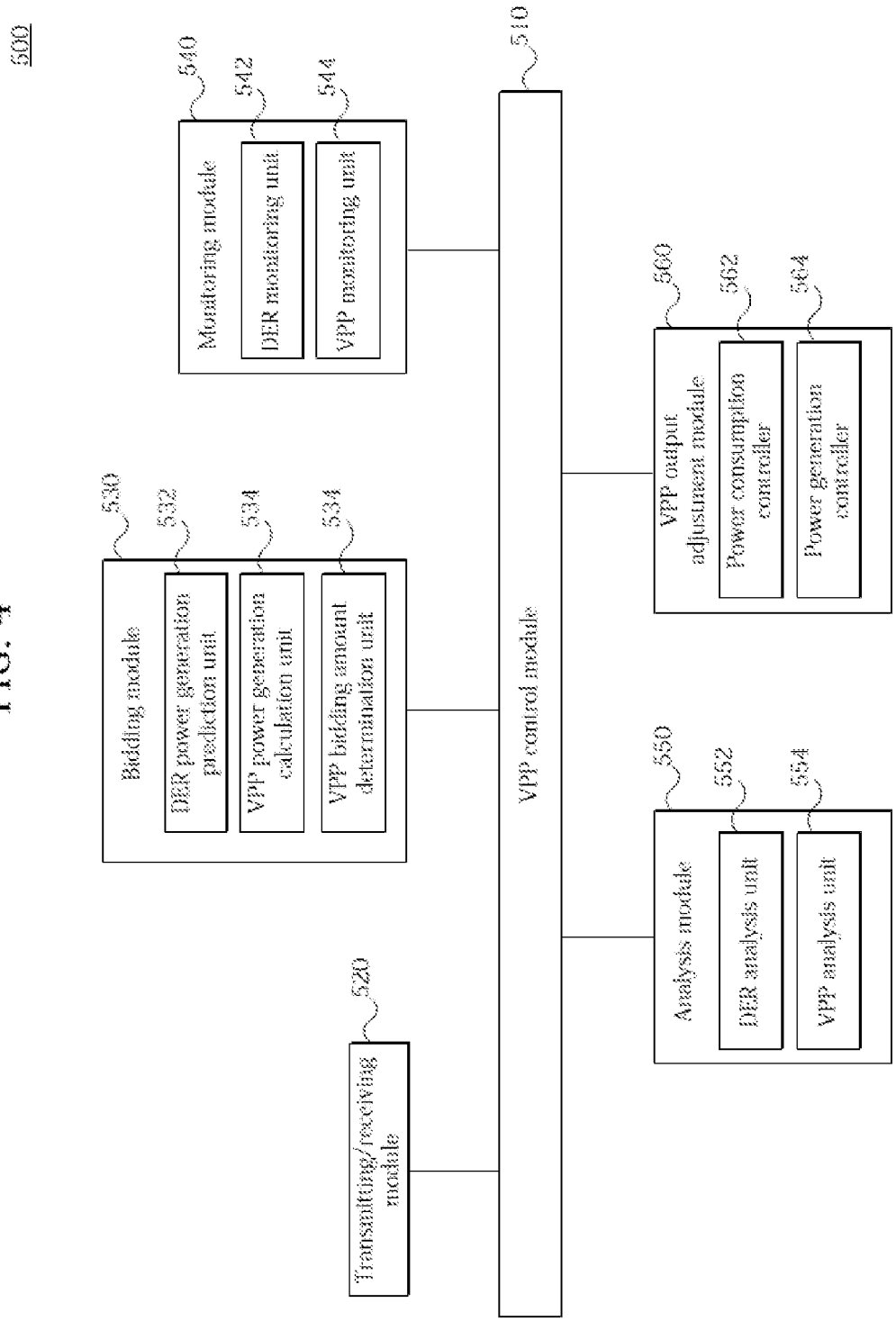
FIG. 4 is a block diagram showing a schematic configuration of a virtual power plant management device according to an exemplary embodiment of the present invention.

FIG. 4 is a block diagram showing a schematic configuration of a virtual power plant management device according to an exemplary embodiment of the present invention. In this case, the virtual power plant management device 500, only schematic configurations required for description according to the exemplary embodiment of the present invention are illustrated and the present invention is not limited to the configurations.

Referring to FIG. 4, the virtual power plant management device 500 according to an exemplary embodiment of the present invention may predict the expected power generation amount of a plurality of distributed energy resources 210-1 to **210-*m* connected to the virtual power plant 200, and proceeds a bidding with the power exchange 20**.

In addition, the virtual power plant management device 500 may analyze the output variation and error of the virtual power plant 200 due to the output variation of the plurality of distributed energy resources 210-1 to **210-*m*. Also, the virtual power plant management apparatus 500 may stabilize the output fluctuation of the virtual power plant 200 by controlling the VPP output adjustment system 300 based on the analysis result The virtual power plant management device 500 according to an exemplary embodiment of the present invention includes a VPP control module 510, a transmitting/receiving module 520, a bidding module 530, a monitoring module 540, an analysis module 550, and a VPP output adjustment module 560**.

The VPP control module 510 may analyze the output variation and error of the virtual power plant 200 due to the output variation of the plurality of distributed energy resources 210-1 to **210-*m* and the demand variation of the load 220. Also, The VPP control module 510 may control the operation of each unit to stabilize the output fluctuation of the virtual power plant by controlling the VPP output adjustment system 300** based on the analysis result.

The transmitting/receiving module 220 may transmit virtual power plant information to the power trading device 100 and receive power system information and power system analysis information from the power trading device 100.

For example, the virtual power plant information includes power generation information of the plurality of distributed energy resources 210-1 to **210-*m*, power consumption information of the load 220, and the like. In addition, the transmitting/receiving module 520 may transmit the metered data measured by the virtual power plant 200 to the power trading device 100. In addition, the transmitting/receiving module 520 may receive power system information and power system analysis information from the power trading device 100**.

The bidding module 530 may execute a bid with the power trading device 100 by predicting the expected power generation amount of the plurality of distributed energy resources 210-1 to **210-*m*. Further, the bidding module 530 may analyze the expected power generation amount of each distributed energy resource based on the characteristics and power generation capacity of each distributed energy resource. In addition, the bidding module 530 may derive the VPP predicted power generation amount by summing the predicted power generation amounts of the plurality of distributed energy resources 210-1 to 210-*m***.

Further, the bidding module 530 may conduct a bidding with the power trading device 100 based on the VPP expected generation amount and determine the VPP bidding power generation amount. Herein, the VPP expected power generation amount includes the amount of power generation that the plurality of distributed energy resources 210-1 to **210-*m* connected to the virtual power plant 200 are expected to generate during the bidding period. In addition, the VPP bidding power generation amount includes the power supply amount or power output amount supplied from the virtual power plant 200 to the power system 10** during the bidding period.

In addition, the bidding module 530 according to an exemplary embodiment of the present invention may include a distributed energy resource power generation prediction unit 532, a VPP power generation calculation unit 534, and a VPP bidding amount determination unit 536.

The distributed energy resource power generation prediction unit 532 may analyze the expected generation amount of each distributed energy resource based on the characteristics and generation capacity of each distributed energy resource. In addition, the distributed energy resource power generation prediction unit 532 may predict the amount of power generation that the plurality of distributed energy resources 210-1 to **210-*m*** can generate at a specific point in time or during a bidding period based on the expected power generation amount of each distributed energy resource.

The VPP power generation calculation unit 534 may derive the VPP expected power generation amount that can be generated in the virtual power plant 200 by summing the predicted power generation amounts of the plurality of distributed energy resources 210-1 to **210-*m***.

In addition, the VPP bidding amount determination unit 536 may determine the VPP bidding generation amount based on the VPP expected power generation amount. Further, the VPP bidding generation determination unit 536 may determine the VPP bidding generation amount by subtracting the power consumption expected to be consumed by the load 220 of the virtual power plant 200 for a predetermined period from the VPP expected power generation amount.

The monitoring module 240 may monitor the power generation amount of the distributed energy resource 210 connected to the virtual power plant 200 and the power usage amount of the load 220 disposed in the virtual power plant 200 in real time.

For example, the monitoring module 540 may monitor the actual power generation amount of the plurality of distributed energy resources 210-1 to **210-*m* in real time. In addition, the monitoring module 540 may monitor the amount of power generation of the individual distributed energy resource 210**, the amount of change in the amount of power generation, and the rate of change in the amount of power generation in real time.

Further, the monitoring module 540 may monitor in real time the amount of electricity used, the amount of change in the amount of electricity used and the rate of change in the amount of electricity used of the load 220 connected to the virtual power plant 200.

In addition, the monitoring module 540 according to an exemplary embodiment of the present invention may include a distributed energy resource monitoring unit 542 and a VPP monitoring unit 544.

The distributed energy resource monitoring unit 542 may monitor the actual power generation amount of the plurality of distributed energy resources 210-1 to **210-*m* connected to the virtual power plant 200 in real time. In addition, the distributed energy resource monitoring unit 542** may monitor the amount of power generation, the amount of change in the amount of power generation, and the rate of change in the amount of power generation of the individual distributed energy resource 210 in real time.

The VPP monitoring unit 544 may monitor the amount of power generation and power consumption of the virtual power plant 200 in real time. Further, the VPP monitoring unit 544 may monitor a total amount of power generated by the plurality of distributed energy resources 210-1 to 210-$m$ of the virtual power plant 200 and a total amount of power used by the load 220 of the virtual power plant 200 in real time.

For example, the VPP monitoring unit 544 may monitor the amount of surplus power of the virtual power plant 200 in real time. Herein, the amount of surplus power may include a value obtained by subtracting the total amount of power generated by the load 220 of the virtual power plant 200 from the total power generated by the plurality of distributed energy resources 210-1 to 210-$m$ of the virtual power plant 200.

In addition, the analysis module 550 may analyze the output variation of the individual distributed energy resource 210. Further, the analysis module 550 may analyze the output variation and error of the virtual power plant 200 due to the output variation of the plurality of distributed energy resources 210-1 to 210-$m$ based on the virtual power plant information of the virtual power plant 200.

Further, the analysis module 550 may analyze changes in system frequency, power supply and demand imbalance, net load information, response amount information, and output information of the renewable energy source of the power system 10 based on the power system information received from the transmitting/receiving module 520.

In addition, the analysis module 550 according to an exemplary embodiment of the present invention may include a distributed energy resource analysis unit 552 and a VPP analysis unit 554.

The distributed energy resource analysis unit 552 may analyze the output variation of the individual distributed energy resource 210 and the output variation of the plurality of distributed energy resources 210-1 to 210-$m$ based on the actual power generation amount of the plurality of distributed energy resources 210-1 to 210-$m$ monitored by the monitoring module 540.

And, the VPP analysis unit 554 may analyze the output variation and error of the virtual power plant 200 due to the output variation of the plurality of distributed energy resources 210-1 to 210-$m$ and the demand variation of the load 220.

Further, the VPP analysis unit 554 may analyze the output variation and error of the virtual power plant 200 due to the output variation of the plurality of distributed energy resources 210-1 to 210-$m$ based on the amount of surplus power of the virtual power plant 100 monitored by the monitoring module 540.

In addition, the VPP analysis unit 554 may predict the demand response and power demand of the load 220 disposed in the virtual power plant 200, and analyze the output variation and error of the virtual power plant 200 based on the power demand.

The VPP output adjustment module 560 may control the operation of the virtual power plant output adjustment system 600 based on the analysis result of the analysis module 550. Specifically, the VPP output adjustment module 560 may control the amount of power consumption and power generation of the virtual power plant output adjustment system 600. Through this, the VPP output adjustment module 560 may adjust the amount of output provided from the virtual power plant 200 to the power system 10 and stabilize the output fluctuations of the virtual power plant 200.

Herein, the VPP output adjustment module 560 may control the amount of power consumption and power generation of the virtual power plant output adjustment system 600 by using at least one of the VPP bidding power generation amount, the zone frequency of the virtual power plant 200, the power generation amount of the individual distributed energy resource 210, the individual bidding power generation amount of the individual distributed energy resource 210, and power system information (eg, using at least one of grid frequency, power supply and demand information, reserve power, net load, response amount, new renewable output fluctuation, etc.), and control signals received from outside the virtual power plant (eg, power exchange).

Of course, the VPP output adjustment module 560 may control the amount of power consumption and power generation of the virtual power plant output adjustment system 600 by considering the VPP bidding power generation amount, the zone frequency of the virtual power plant 200, the power generation amount of the individual distributed energy resource 210, the individual bidding power generation amount of the individual distributed energy resource 210, and power system information (eg, using at least one of grid frequency, power supply and demand information, reserve power, net load, response amount, new renewable output fluctuation, etc.), and control signals received from outside the virtual power plant (eg, power exchange) in a complex manner.

In addition, the VPP output adjustment module 560 according to an exemplary embodiment of the present invention may include a power consumption controller 562 and a power generation controller 564.

The power consumption control unit 562 may control the power consumption or heat production of the virtual power plant output adjustment system 600 based on the VPP bidding power generation amount, the zone frequency of the virtual power plant 200, the power generation amount of the individual distributed energy resource 210, the individual bidding power generation amount of the individual distributed energy resource 210, power system information, and a control signal received from the outside of the virtual power plant, etc.

In addition, the generation amount control unit 554 may control the generation amount of the virtual power plant output adjustment system 600 based on the VPP bidding power generation amount, the zone frequency of the virtual power plant 200, the power generation amount of the individual distributed energy resource 210, the individual bidding power generation amount of the individual distributed energy resource 210, power system information, and a control signal received from the outside of the virtual power plant.

Figure 5:
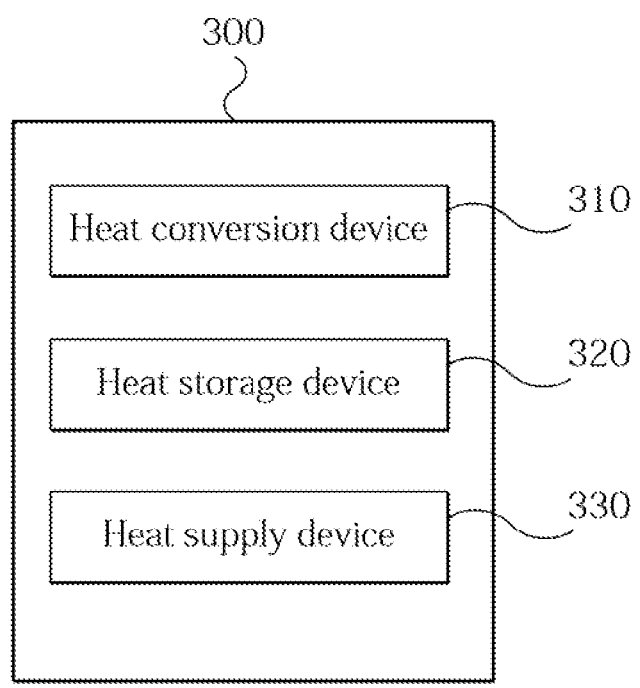
FIG. 5 is a block diagram showing a schematic configuration of a first output adjustment system according to an exemplary embodiment of the present invention.

FIG. 5 is a block diagram showing a schematic configuration of a first output adjustment system according to an exemplary embodiment of the present invention. In this case, the first output adjustment system 300, only schematic configurations required for description according to the exemplary embodiment of the present invention are illustrated and the present invention is not limited to the configurations.

Referring to FIG. 5, the first output adjustment system 300 according to an exemplary embodiment of the present invention may include a heat conversion device 310, a heat storage device 320, and a heat supply device 330.

The heat conversion device 310 may receive the power generated from the plurality of distributed energy resources, and convert it into heat energy. In addition, the heat conversion device 310 may supply the converted heat energy to the heat storage device 320 or the heat supply device 330.

Herein, the heat conversion device 310 may include a boiler or an electric heater. In addition, the heat storage device 320 may include a heat storage tank for storing the heat energy. Further, the heat supply device 330 may include a heat pump for supplying the heat energy to a heat load, but the configuration of the present invention is not limited thereto.

In addition, the heat conversion device 310 may store the produced heat energy in a large-capacity heat storage tank and provide it to a heat load disposed in the power system 10 or the virtual power plant 200.

As described above, the present invention provides an environment capable of not only stabilizing the output of the virtual power plant but also preventing the waste of energy sources by storing the heat energy produced by the heat conversion device 310 in a large capacity and providing it to the heat load.

Figure 6:
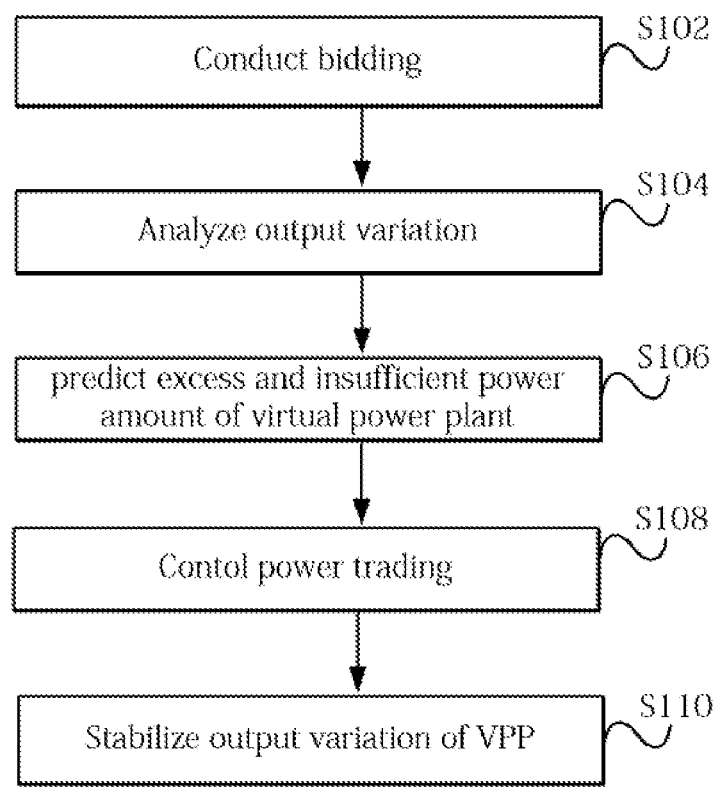
FIG. 6 is a flowchart briefly showing a process of conducting a bid with a virtual power plant, and controlling power trading by predicting an excess and insufficient power amount of a virtual power plant according to an exemplary embodiment of the present invention.

FIG. 6 is a flowchart briefly showing a process of conducting a bid with a virtual power plant, and controlling power trading by predicting an excess and insufficient power amount of a virtual power plant according to an exemplary embodiment of the present invention. Hereinafter, the following flow chart will be described by using the same reference numerals which are attached to components of FIG. 1 to FIG. 5.

Referring to FIG. 5, the power trading device 100 according to an exemplary embodiment of the present invention may conduct a bidding with the plurality of virtual power plant 200-1 to 200-n, and determine the VPP bidding power generation amount supplied from the virtual power plant 200 to the power system 10 at step S102.

Herein, the VPP bidding power generation amount includes a power supply amount or power output amount supplied from the virtual power plant 200 to the power system 10 during the bidding period.

In addition, the power trading device 100 may analyze the output variation of the plurality of virtual power plant 200-1 to 200-n due to the output variation of the distributed energy resource 210 at step S104. Herein, the power trading device 100 may complexly analyze the bidding error, the output variation, or the demand variation of each of the plurality of virtual power plant 200-1 to 200-n.

Then, the power trading device 100 may predict the excess and insufficient power amount of each of the plurality of virtual power plant 200-1 to 200-n due to the output variation of the distributed energy resource 220, the bidding error of the virtual power plant, and the demand variation of the load 220 at step S106.

Herein, the excess and insufficient power amount may include a surplus power generated in excess of the virtual power plant 200 generated by a sudden increase in the output of the distributed energy resource 210 connected to the virtual power plant 200. In addition, the excess and insufficient power amount may include an insufficient amount of power of the virtual power plant 200 generated by a sudden decrease in the output of the distributed energy resource 210 or a rapid increase in the power consumption of the load 220.

And, the power trading device 100 may control the power trading of the plurality of virtual power plant 200-1 to 200-n to solve the excess and insufficient power amount of each of the plurality of virtual power plant 200-1 to 200-n at step S108.

For example, if a surplus power is generated in the virtual power plant 200 due to the bidding error, the output variation, or the demand variation, the power trading device 100 may control the power trading to supply a surplus power of a virtual power plant 200 to the heat conversion device 310, thereby stabilizing an output of the virtual power plant 200 at step S110.

In addition, if an output shortage is predicted in the virtual power plant 200 due to the bidding error, the output variation, or the demand variation, the power trading device 100 may control the power trading to supply a power generated in the renewable combined heat and power plant 410 to the virtual power plant 200 or the power system 10, thereby stabilizing the output of the virtual power plant 200 and the power system 10.

Figure 7:
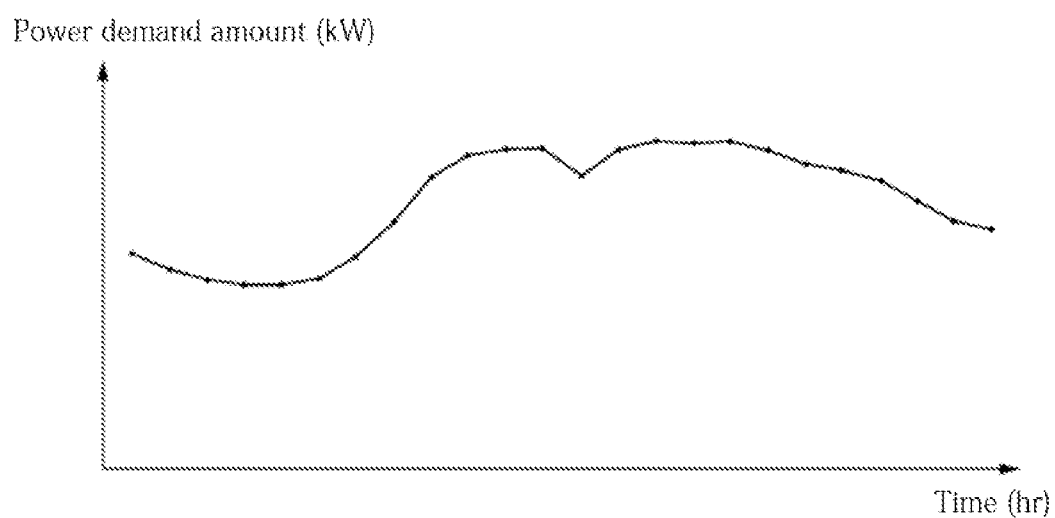
FIG. 7 is a graph showing a typical daily power demand curve in the power system.
Figure 8:
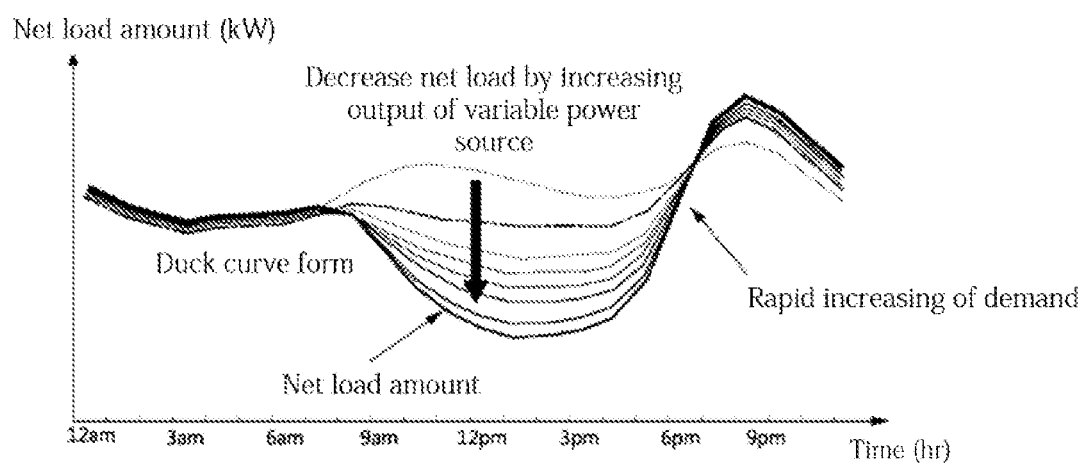
FIG. 8 is a graph illustrating a change in a net load amount due to an increase in output of a variable power supply.

FIG. 7 is a graph showing a typical daily power demand curve in the power system, and FIG. 8 is a graph illustrating a change in a net load amount due to an increase in output of a variable power supply.

Referring to FIG. 7 and FIG. 8, when the output variability of the variable power connected to the power system 10 or the distributed energy resource connected to the virtual power plant 100 increases, the net load is formed in the form of a duck curve. In particular, when the proportion of the variable power source (for example, a renewable energy source) connected to the power system 10 or the virtual power plant 200 is increased, the power demand curve is expected to change in a pattern different from the existing power demand curve due to the phenomenon that the power load decreases sharply after sunrise and the power load increases rapidly after sunset. In addition, when the duck-curve phenomenon intensifies, it is expected that the power demand forecasting error increases and the pharmaceutical cost increases.

For example, a wind power generator, which is a renewable energy source, has an output greatly influenced by wind speed, and a solar power generator has an output dependent on the amount of insolation of a photovoltaic module. In addition, the output of renewable energy sources such as wind power and solar power is increased during the daytime, and for this reason, the net load of the power system 10 or the virtual power plant 200 obtained by subtracting the output of the renewable energy source from the total load of the power system 10 or the virtual power plant 200 is greatly reduced.

In particular, when the renewable energy source is connected to the power system 10 or the virtual power plant 200 during the daytime of the season when the output variability of the renewable energy source is large, there is a problem that causes an imbalance in power supply and demand of the power system 10 or the virtual power plant 200, and the system frequency of the power system 10 or the zone frequency of the virtual power plant 200 becomes unstable.

Therefore, the present invention connects the virtual power plant output adjustment device 310 to the virtual power plant 200, and by adjusting the power consumption and generation amount of the virtual power plant output adjustment device 310 consumes the surplus power of the virtual power plant 200 or supplements the insufficient output of the virtual power plant 200. Through this, the present invention provides an environment capable of resolving output fluctuations and errors of the virtual power plant caused by output fluctuations of distributed energy resources, and stabilizing the output of the virtual power plant.

Figure 9:
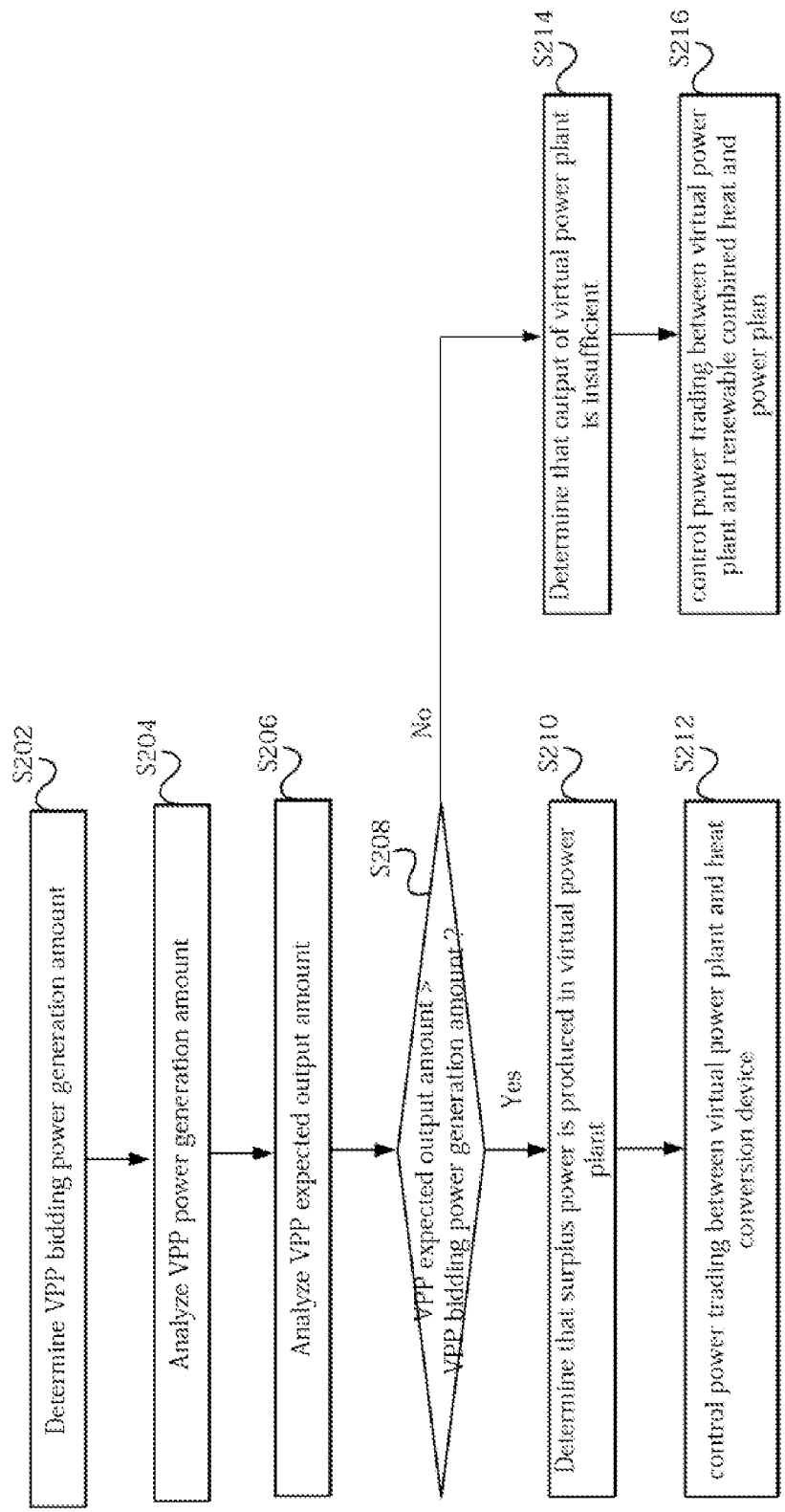
FIG. 9 is a flowchart briefly showing a process of controlling power trading by comparing a VPP bidding power generation amount and a VPP expected output amount according to an exemplary embodiment of the present invention.

FIG. 9 is a flowchart briefly showing a process of controlling power trading by comparing a VPP bidding power generation amount and a VPP expected output amount according to an exemplary embodiment of the present invention. Hereinafter, the following flow chart will be described by using the same reference numerals which are attached to components of FIG. 1 to FIG. 5.

Referring to FIG. 9, the power trading device 100 according to an exemplary embodiment of the present invention may conduct a bidding with the plurality of virtual power plant 200-1 to 200-n, and determine the VPP bidding power generation amount of each of the plurality of virtual power plant 200-1 to 200-n at step S202.

And, the power trading device 100 may monitor the amount of power generated by the distributed energy resource 210 connected to the plurality of virtual power plant 200-1 to 200-n in real time, and determine the VPP power generation amount generated from the plurality of virtual power plant 200-1 to 200-n at step S204.

Then, the power trading device 100 may analyze the VPP expected output amount by subtracting the power consumption by the load 120 of the virtual power plant 200 from the VPP power generation amount of the virtual power plant 200 at step S206.

And, the power trading device 100 may analyze the excess and insufficient power amount of the virtual power plant 200 by comparing a VPP bidding power generation amount of the virtual power plant 200 and a VPP expected output amount of the virtual power plant 200 at step S208.

For example, when the VPP expected output amount is greater than the VPP bidding power generation amount, the power trading device 100 may determine that the surplus power is produced in the virtual power plant 200 at step S210.

And, the power trading device 100 may control the power trading so that the virtual power plant 200 supplies the surplus power equal to the difference between the VPP expected output amount and the VPP bidding power generation amount to the heat conversion device 310 at step S212.

Further, when the VPP expected output amount is less than the VPP bidding power generation amount, the power trading device 100 may determine that the output of the virtual power plant 200 will be insufficient at step S214.

In addition, the power trading device 100 may control the power trading so that the renewable combined heat and power plant 410 produces power equal to the difference between the VPP bidding power generation amount and the VPP expected output amount, and supplies to the virtual power plant 200 or the power system 10 at step S216.

Figure 10:
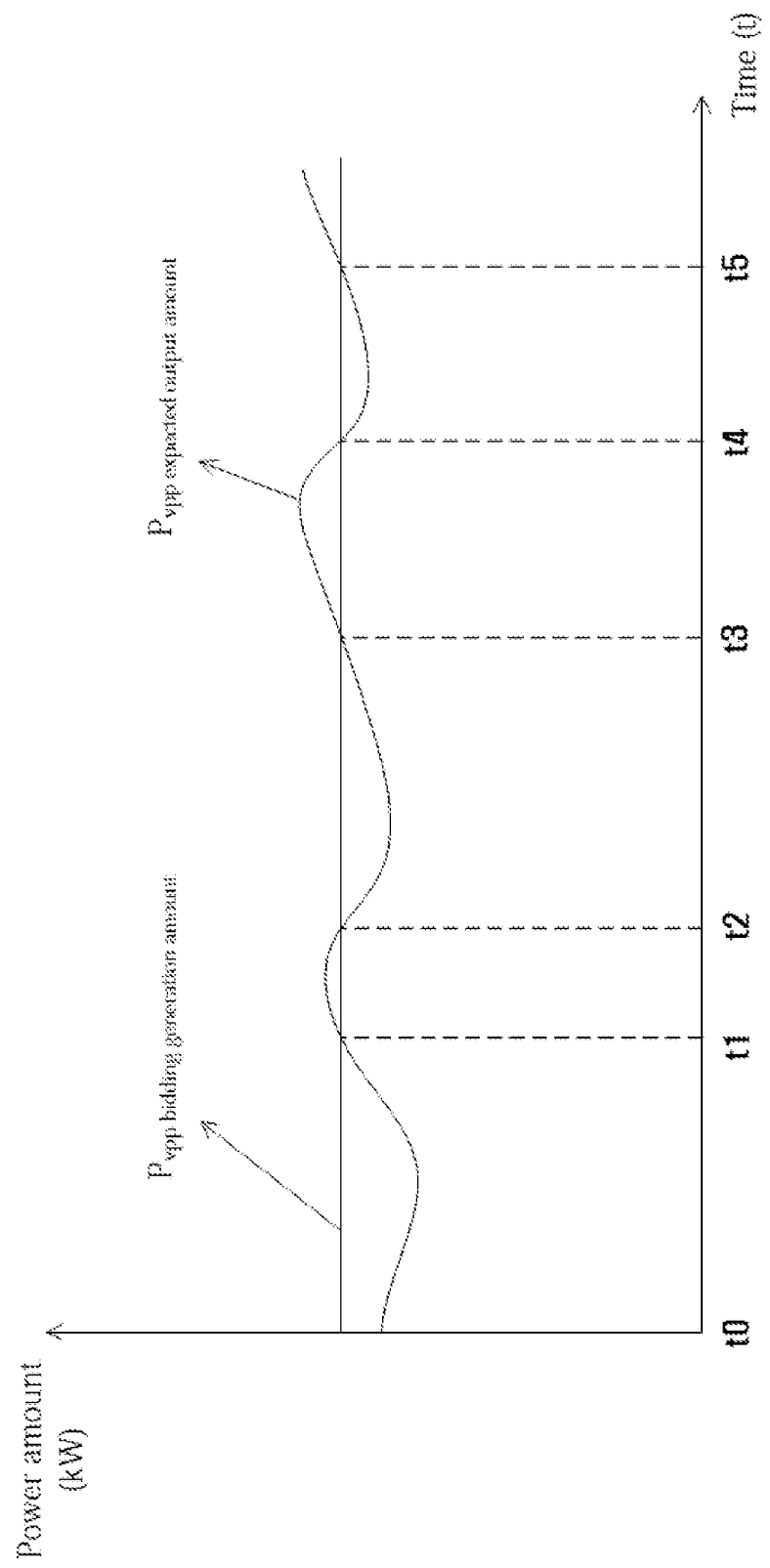
FIG. 10 is a graph showing an example of controlling power trading by comparing a VPP bidding power generation amount and VPP expected output amount according to an exemplary embodiment of the present invention.

FIG. 10 is a graph showing an example of controlling power trading by comparing a VPP bidding power generation amount and VPP expected output amount according to an exemplary embodiment of the present invention.

Referring to FIG. 10, the power trading device 100 according to an exemplary embodiment of the present invention may control the power trading between the plurality of virtual power plant 200-1 to 200-n and the heat conversion device 310 by comparing the VPP bidding power generation amount $P_{vpp\ bidding\ generation\ amount}$ and the VPP expected output amount $P_{vpp\ expected\ output\ amount}$ in real time. Also the power trading device 100 may control the power trading between the plurality of virtual power plant 200-1 to 200-n and the renewable combined heat and power plant 410 by comparing the VPP bidding power generation amount $P_{vpp\ bidding\ generation\ amount}$ and the VPP expected output amount $P_{vpp\ expected\ output\ amount}$ in real time.

For example, in the sections t0 to t1, t2 to t3, t4 to t5 in which the VPP expected output amount $P_{vpp\ predicted\ output\ amount}$ is smaller than the VPP bid generation amount $P_{vpp\ bidding\ power\ generation\ amount}$, it may be determined that the power generation and output of the virtual power plant 200 will be insufficient.

And, the present invention may increase the power generation amount of the renewable combined heat and power plant 410 in the sections t0 to t1, t2 to t3, t4 to t5.

In addition, the present invention can supplement the insufficient amount of power generation and output of the virtual power plant 200 by supplying the electric power produced in the renewable combined heat and power plant 410 to the virtual power plant 200 or the power system 10.

Further, in the sections t1 to t2, t3 to t4 in which the VPP expected output amount $P_{vpp\ predicted\ output\ amount}$ is larger than the VPP bidding power generation amount $P_{vpp\ bidding\ power\ generation\ amount}$, it may be determined that the surplus power is produced in the virtual power plant 200.

In addition, the present invention may supply the surplus power of the virtual power plant 200 to the heat conversion device 310 in the sections t1 to t2, t3 to t4, and the heat conversion device 310 may consume the surplus power of the virtual power plant 200.

Of course, although in the sections t1 to t2, t3 to t4 the VPP expected output amount $P_{vpp\ expected\ output\ amount}$ is larger than the VPP bidding power generation amount $P_{vpp\ bidding\ power\ generation\ amount}$, if the VPP expected output amount is smaller than the VPP bidding power generation amount due to a sharp increase in the power consumption of the load 120, it is possible to control to supply the power of renewable combined heat and power plant 410 to the virtual power plant 200.

As described above, the power trading system and power trading method of the virtual power plant according to an exemplary embodiment of the present invention analyzes the excess and insufficient power amount of the virtual power plant due to the output variation of the distributed energy resource, and controls the power trading between the virtual power plant and the heat conversion device according to the excess and insufficient power amount or controls the power trading between the virtual power plant and the renewable combined heat and power plant according to the excess and insufficient power amount, thereby stabilizing the output of the power system and the virtual power plant.

Further, according to the present invention, the surplus power produced by the output fluctuation of distributed energy resource is supplied to the heat conversion device, and the power trading is controlled so that the heat conversion device consumes the surplus power to produce thermal energy. Through this, it is possible to minimize the output fluctuation of the virtual power plant due to the output fluctuation of the distributed energy resource, which is difficult to control the output such as a renewable energy source, and to maintain the output of the virtual power plant stably.

Further, the present invention provides an environment in which the waste of energy sources can be prevented by storing the heat energy produced in the heat conversion device in a large capacity and providing it to the heat load.

Further, the present invention may adjust the amount of power generation of the renewable combined heat and power plant in response to output fluctuations of the virtual power plant and the distributed energy resources, and supplement the insufficient output of the virtual power plant with the power generated in the renewable combined heat and power plant. Through this, it provides an environment in which the output of the virtual power plant can be stably maintained by minimizing the output shortage of the virtual power plant caused by distributed energy resources that are difficult to control output such as new and renewable energy sources and the output fluctuation of the virtual power plant.

Further, the present invention may analyze the predicted power generation amount of each individual distributed energy resource, derive the VPP predicted power generation amount by summing the predicted power generation amount of the distributed energy resources, and derive the VPP bidding power generation amount based on the VPP predicted power generation amount. Through this, the present invention provides an environment in which the optimal bidding power generation amount can be effectively determined.

Further, the present invention may derive the VPP power generation amount or the VPP expected output amount generated in real time within the virtual power plant by monitoring the amount of power generated from a plurality of distributed energy resources, and control the power trading between the power transaction between the virtual power plant and the heat conversion device and the renewable combined heat and power plant by comparing the VPP power generation amount or VPP expected output amount with the VPP bidding power generation amount. Through this, the present invention provides an environment capable of stably maintaining the output of the virtual power plant.

Further, the present invention may detect the system frequency of the power system or the zone frequency of the virtual power plant in real time, and control the power trading based on the detected frequency. Through this, the present invention provides an environment capable of preventing a sudden change in the system frequency of the power system and a sudden change in the zone frequency of the virtual power plant due to output fluctuations of distributed energy resources, which are variable power sources.

Further, the present invention controls the power trading based on at least one of the VPP bidding power generation amount, the power generation amount of individual distributed energy resources, system information of the power system, or a control signal received from the power exchange. Through this, the present invention provides an environment capable of stably maintaining the output of the virtual power plant and stably maintaining the power system.

The foregoing exemplary embodiments of the present invention are not implemented only by an apparatus and a method, and therefore, may be realized by programs realizing functions corresponding to the configuration of the exemplary embodiment of the present invention or recording media on which the programs are recorded. Such a recording medium may be executed not only in the server but also in the user terminal.

Although the exemplary embodiment of the present invention has been described in detail hereinabove, the scope of the present invention is not limited thereto. That is, several modifications and alterations made by those skilled in the art using a basic concept of the present invention as defined in the claims fall within the scope of the present invention.

What is claimed is:

1. A power trading system of virtual power plant (VPP), comprising:
    a plurality of virtual power plants connected to a power system and including a distributed energy resource;
    a heat conversion device connected to the power system and converting the power generated from the plurality of distributed energy resources into thermal energy, wherein the heat conversion device comprises a boiler or an electric heater connected to a heat storage tank and a heat pump, wherein the heat storage tank stores the thermal energy converted by the boiler or electric heater, wherein the heat pump supplies the stored thermal energy to a heat load; and
    a power trading device comprising a processor and a memory storing instructions that, when executed by the processor, configure the power trading service to analyze an excess and insufficient power amount of the plurality of virtual power plant due to an output variation of the distributed energy resource, control power trading between the plurality of virtual power plant, the power system, or the heat conversion device by using the analysis result of the excess and insufficient power amount to stabilize the output of the power system and the virtual power plant,
    wherein the power trading device is further configured to
        monitor a VPP power generation amount by collecting real-time power generation data from the distributed energy resources,
        derive a VPP expected output amount by subtracting a power consumption of loads in the virtual power plants from the monitored VPP power generation amount,
        compare the derived VPP expected output amount with a VPP bidding power generation amount,
        analyzes a response amount at which the distributed energy resources additionally generate power in order to respond to an output variation of a variable power source connected to the virtual power plant and a response rate at which the distributed energy resources additionally generate power in order to respond to an output variation of the variable power source, wherein the response rate comprises a ramp rate characteristic indicating a power generation rate change per minute, and
        in response to power supplying in the virtual power plant being smaller than the power demand of load disposed in the virtual power plant due to the decrease in the output of the variable power source, and the response amount and the response rate of the distributed energy resources not meeting power demand amount of the load disposed in the virtual power plant, control the heat conversion device to reduce power consumption and increase a power trading amount from a renewable combined heat and power plant to the virtual power plant, wherein the renewable combined heat and power plant generates power using at least one of a wood chip, a fuel cell, or by-product gas.

2. The system of claim 1,
    wherein the power trading device is further configured to control the power trading to supply power produced in the renewable combined heat and power plant to the plurality of virtual power plant or the power system based on a prediction result of the excess and insufficient power amount.

3. The system of claim 2, wherein the power trading device is further configured to analyze at least one of a power generation amount, a bidding error, and an output variation or a demand variation of the plurality of virtual power plant, and control the power trading by using at least one of the power generation amount, the bidding error, and the output variation or the demand variation.

4. The system of claim 3, wherein the power trading device is further configured to control the power trading to supply a surplus power of the virtual power plant to the heat conversion device to stabilize an output of the virtual power plant in response to the surplus power being generated in at least one virtual power plant of the plurality of virtual power plant due to the bidding error, the output variation, or the demand variation.

5. The system of claim 3, wherein the power trading device is further configured to control the power trading to supply a power generated in the renewable combined heat and power plant to the virtual power plant or the power system to stabilize an output of the virtual power plant in response to an output shortage being predicted in at least one virtual power plant of the plurality of virtual power plant due to the bidding error, the output variation, or the demand variation.

6. The system of claim 1, wherein the power trading device is further configured to determine that a surplus power is produced in the virtual power plant in response to the VPP expected output amount being greater than the VPP bidding power generation amount, and control the power trading so that the virtual power plant supplies a surplus power of the difference between the VPP expected output amount and the VPP bidding power generation amount to the heat conversion device.

7. The system of claim 1, wherein the power trading device is configured to determine that an output of the virtual power plant is insufficient in response to the VPP expected output amount being less than the VPP bidding power generation amount, and control the power trading so that the renewable combined heat and power plant generates power of a difference between the VPP bidding power generation amount and the VPP expected output amount and supplies it to the virtual power plant or the power system.

8. The system of claim 1, wherein the power trading device is configured to control the power trading by predicting a demand response of a load connected to the power system or the plurality of virtual power plants.

9. A power trading method of virtual power plant (VPP), the method comprising:
analyzing an output variability of a distributed energy resource disposed to a virtual power plant connected to a power system, wherein a heat conversion device comprises a boiler or an electric heater connected to a heat storage tank and a heat pump, wherein the heat storage tank stores the thermal energy converted by the boiler or electric heater, wherein the heat pump supplies the stored thermal energy to a heat load;
monitoring a VPP power generation amount by collecting real-time power generation data from the distributed energy resource;
deriving a VPP expected output amount by subtracting a power consumption of loads in the virtual power plant from the monitored VPP power generation amount;
comparing the derived VPP expected output amount with a VPP bidding power generation amount;
predicting an excess and insufficient power amount of the virtual power plant according to the output variability of the distributed energy resource;
controlling power trading between the virtual power plant, the power system, the heat conversion device connected to the power system, or a renewable combined heat and power plant connected to the power system based on the prediction result of the excess and insufficient power amount, and controlling the power trading to consume the surplus power of the virtual power plant in the heat conversion device or to supplement an insufficient output of the virtual power plant with the power of the renewable combined heat and power plant, wherein the renewable combined heat and power plant generates power using at least one of a wood chip. a fuel cell, or by-product gas;
analyzing a response amount at which the distributed energy resources additionally generate power in order to respond to an output variation of a variable power source connected to the virtual power plant and a response rate at which the distributed energy resources additionally generate power in order to respond to an output variation of the variable power source, wherein the response rate comprises a ramp rate characteristic indicating a power generation rate change per minute; and
in response to the response amount or the response rate of the distributed energy resources not meeting power demand amount of the load disposed in the virtual power plant, controlling the heat conversion device to reduce power consumption and increasing a power trading amount from the renewable combined heat and power plant to the virtual power plant.

10. The method of claim 9, wherein the controlling the power trading controls the power trading based on at least one of the VPP bidding power generation amount of the virtual power plant, a power generation amount of the distributed energy resource, system information of a power system, or a control signal received from outside of the virtual power plant.

11. The method of claim 9, wherein: the adjusting the power trading includes determining that surplus power is produced in the virtual power plant in response to the VPP expected output amount being greater than the VPP bidding power generation amount, and controlling power trading between the virtual power plant and the heat conversion device to supply the surplus power of a difference between the VPP expected output amount and the VPP bidding power generation amount to the heat conversion device.

12. The method of claim 9, wherein: the adjusting the power trading includes determining that an output of the virtual power plant is insufficient in response to the VPP expected output amount being less than the VPP bidding power generation amount, and controlling the power trading between the renewable combined heat and power plant and the virtual power plant so that the renewable combined heat and power plant generates power of a difference between the VPP bidding power generation amount and the VPP expected output amount and supplies it to the virtual power plant or the power system.

13. The method of claim 9, further comprising
predicting a demand response of the virtual power plant, and
controlling power trading between the virtual power plant, the power system, the heat conversion device, and the renewable combined heat and power plant based on the demand response.

14. A virtual power plant power trading device, comprising:
a processor; and a memory storing instructions that, when executed by the processor, configure the virtual power plant power trading device to:
collect various data of a virtual power plant (VPP) connected to a power system;
analyze at least one of a power generation amount, a bidding error, an output variation or a demand variation of the virtual power plant, and analyze an output variation of the virtual power plant and an excess and insufficient power amount of the virtual power plant due to change of power generation amount of a distributed energy resource connected to the virtual power plant;

control power trading between a plurality of virtual power plant, heat conversion device, and renewable combined heat and power plant by using at least one of the bidding error, the output variation, and the excess and insufficient power amount of the virtual power plan, wherein the heat conversion device comprises a boiler or an electric heater connected to a heat storage tank and a heat pump, wherein the heat storage tank stores the thermal energy converted by the boiler or electric heater, wherein the heat pump supplies the stored thermal energy to a heat load;

monitor a VPP power generation amount by collecting real-time power generation data from the distributed energy resources;

derive a VPP expected output amount by subtracting a power consumption of loads in the virtual power plants from the monitored VPP power generation amount;

compare the derived VPP expected output amount with a VPP bidding power generation amount;

analyze a response amount at which the distributed energy resources additionally generate power in order to respond to an output variation of a variable power source connected to the virtual power plant and a response rate at which the distributed energy resources additionally generate power in order to respond to an output variation of the variable power source, wherein the response rate comprises a ramp rate characteristic indicating a power generation rate change per minute; and in response to power supplying in the virtual power plant being smaller than the power demand of load disposed in the virtual power plant due to the decrease in the output of the variable power source, and the response amount and the response rate of the distributed energy resources not meeting power demand amount of the load disposed in the virtual power plant, control the heat conversion device to reduce power consumption and increase a power trading amount from the renewable combined heat and power plant to the virtual power plant, wherein the renewable combined heat and power plant generates power using at least one of a wood chip, a fuel cell, or by-product gas.

* * * * *